United States Patent [19]

Holloway et al.

[11] Patent Number: 5,193,829
[45] Date of Patent: Mar. 16, 1993

[54] SUB FRAME SUPPORT SYSTEM AND RUNNING BOARD FOR A VEHICLE

[75] Inventors: John O. Holloway, Portland; Gary M. Scott, Milwaukie, both of Oreg.

[73] Assignee: Warn Industries, Inc., Milwaukie, Oreg.

[21] Appl. No.: 796,063

[22] Filed: Nov. 19, 1991

[51] Int. Cl.$^5$ .............................................. B60R 3/00
[52] U.S. Cl. ................................. 280/163; 280/164.1; 280/166
[58] Field of Search ................. 280/163, 164.1, 164.2, 280/166, 169, 770, 762; 293/128; 296/207, 62, 63, 75; 182/92

[56] References Cited

U.S. PATENT DOCUMENTS

| | | | |
|---|---|---|---|
| 4,021,055 | 5/1977 | Okland | 280/163 |
| 4,311,320 | 1/1982 | Waters, Jr. | 280/163 |
| 4,838,567 | 6/1989 | Michanczyk | 280/163 |
| 4,935,638 | 6/1990 | Straka | 280/163 |
| 4,943,085 | 7/1990 | Straka | 280/163 |

Primary Examiner—Richard M. Camby
Attorney, Agent, or Firm—Robert L. Harrington

[57] ABSTRACT

A running board removably mounted to a vehicle on a sub frame support system. The sub frame support system has brackets adjustably mounted to the vehicle frame which support a receiving frame. The receiving frame is adjustably mounted to the brackets and has a pair of sockets for receiving the supporting members of the running board. The running board is a structural member having shaped support members extending from its ends and configured to mount in the sockets of the receiving frame. The running board is mounted to the vehicle by inserting the supporting members of the running board into the sockets of the receiving frame. Pins retain the support members in the sockets. The running board is removed from the vehicle by merely removing the pins and removing the running board from the receiving frame.

7 Claims, 5 Drawing Sheets

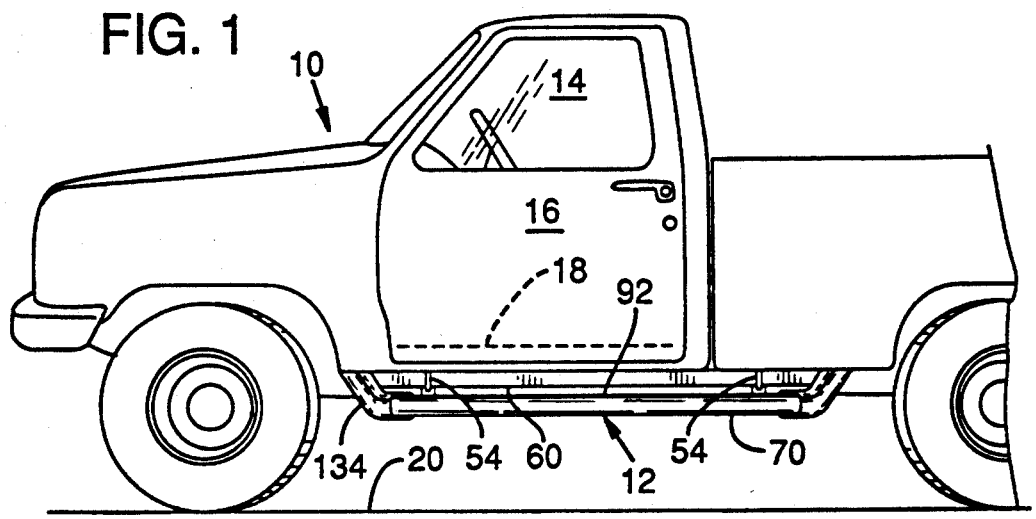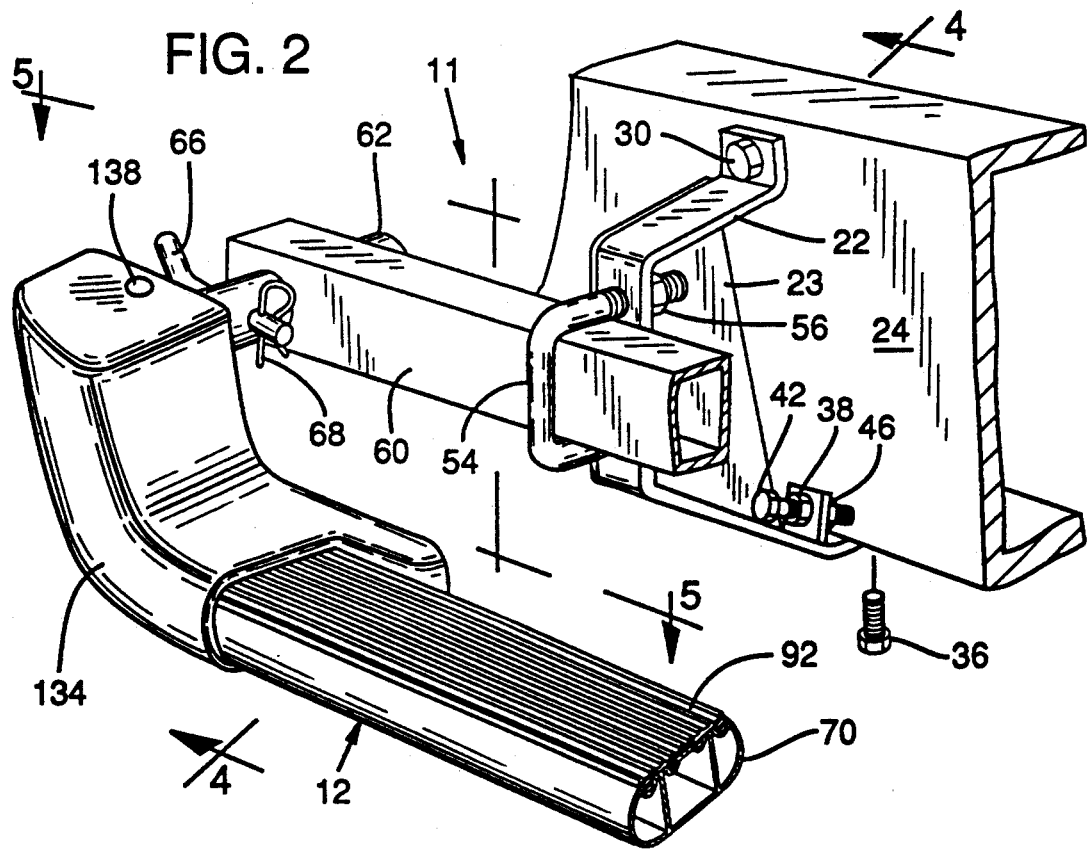

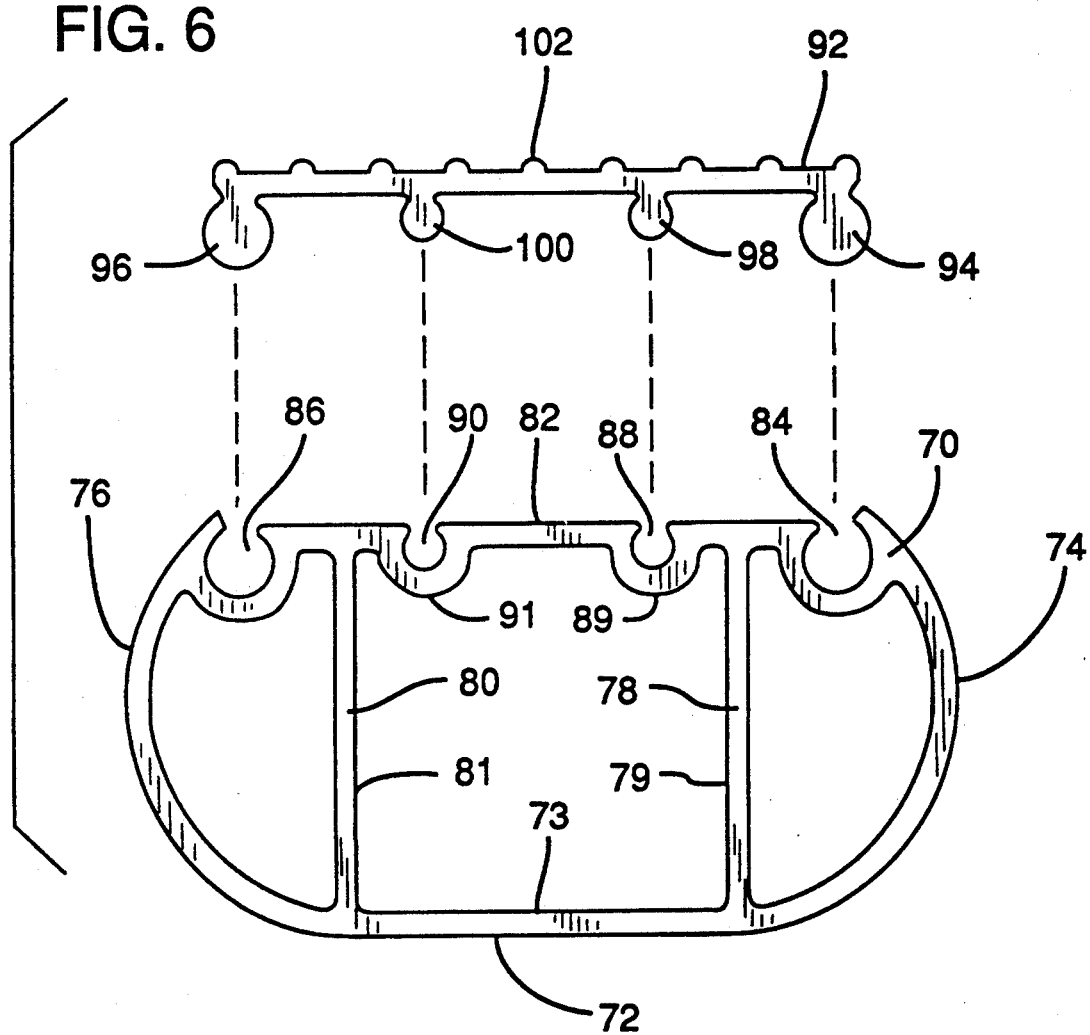

SUB FRAME SUPPORT SYSTEM AND RUNNING BOARD FOR A VEHICLE

BACKGROUND INFORMATION

1. Field of the Invention

This invention relates to a running board for a vehicle and in particular it relates to a running board and sub frame support system for removably mounting a running board to a vehicle.

2. Background Information

Running boards were at one time a standard feature on most passenger vehicles, including light duty trucks such as pickup trucks. Pick-up truck standard feature on most passenger vehicles including light duty trucks such as pickup trucks. The running board provided an intermediate step that was an aid in entering the passenger compartment of the vehicle.

As vehicle designs changed, the body of the vehicles were lowered and the running board disappeared from the design of the vehicle. The body of the vehicles, in addition to being lowered was widened to provide more space in the passenger compartment. This design concept of eliminating running boards carried over to other vehicles that were not lowered in design, such as four wheel drive pickups.

Four wheel drive vehicles are intentionally designed with a relatively high clearance, that is the frame and body is supported at a relatively high distance from the ground. This is a desired characteristic, since the user of the vehicles wants the maximum clearance for traversing adverse road conditions such as deep snow, muddy and rutted roads and the like. Additionally four wheel drive vehicles are often driven off improved roadways where all types of conditions are likely to be encountered.

One of the problems with a high clearance is of the course the height of the entry into the passenger compartment. The floor of the cab is of necessity high above the ground and for many individuals, the required "step" is too high to permit easy entry.

As an aid for people to enter the cab, running boards have been developed for such four-wheel drive vehicles to provide an intermediate step between the ground and the floor of the cab. The running boards are fixedly fastened to the exterior sides of the vehicle and are not easily removed. To provide the auxiliary step, the running boards extend downwardly from the vehicle and of course reduce the road clearance of the vehicle.

BRIEF SUMMARY OF THE INVENTION

A preferred embodiment of the present invention provides for a running board that is removably mounted to a vehicle. A sub frame support system is fixedly mounted to the framework of the vehicle and is so arranged that the sub frame support system does not extend below the framework of the vehicle and therefore will not diminish the road clearance of the vehicle. The running board is removably mounted to the sub frame support system.

The sub frame support system has a receiver frame adjustably attached by brackets affixed to the frame of the vehicle. The receiver frame includes sockets for receiving mated support tubes of the running board. The support tubes are secured in the sockets of the sub frame support system by retaining pins. To remove the running board, the retaining pins are removed and the support tubes of the running board are removed from the receiving sockets.

The invention will be more fully appreciated by reference to the following detailed description and drawings referred to therein.

BRIEF DESCRIPTION OF THE DRAWINGS

FIG. 1 is a view of a running board and sub frame support system of the present invention shown mounted to a vehicle;

FIG. 2 is a partial view showing the mounting arrangement of one end of the running board and sub frame support system;

FIG. 6 is a cross section view of the running board illustrated in FIG. 3.

DESCRIPTION OF THE PREFERRED EMBODIMENT

Figure 3:
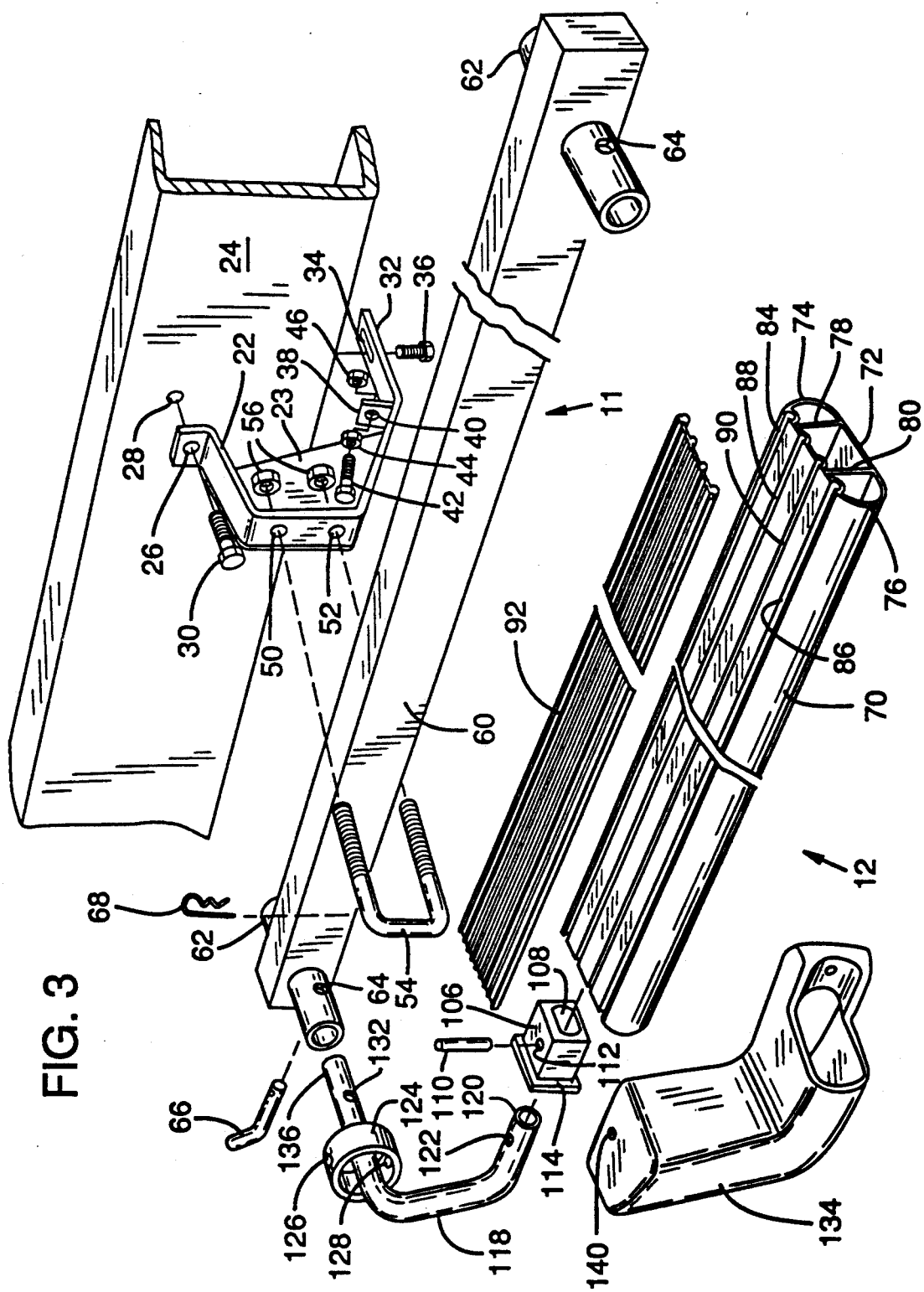
FIG. 3 an exploded view of the running board and sub frame support system.

Refer now to FIG. 1 of the drawings. Illustrated is a running board 12 and sub frame support system 11 mounted to a vehicle 10. The running board 12 provides an auxiliary step to make entry into the passenger compartment (generally indicated by numeral 14) 15 through the door 16 easier. The floor of the compartment 14 is indicated by the dashed line 18 and as shown in the figure, the running board 12 is positioned somewhat intermediate the floor 18 and the ground surface 20.

Refer now to FIGS. 2 and 3 of the drawings which illustrate the mounting arrangement of the sub frame support system 11 and running board 12 to the vehicle 10 such as illustrated in FIG. 1. FIG. 2 illustrates one end of the running board and sub frame support system mounted to a frame of the vehicle 10. The opposite end is a mirror image of that illustrated and it will be understood that the detailed description of the illustrated end hereafter applies as well to the opposite end. FIG. 3 is an exploded view showing more clearly the components of said one end of the running board and sub frame support system. In this embodiment, the sub frame support system with the attached running board are mounted to a frame member 24 of the vehicle 10.

Referring to FIG. 3, the sub frame support system 11 includes a pair of shaped brackets 22 fixedly yet adjustably mountable to the side of the frame member 24. The brackets 22 have re-enforcing gussets 23 to provide strength and rigidity. As shown in FIG. 3, the brackets 22 have a bore 26 alignable with a bore 28 in the side of the vehicle frame member 24. Each bracket 22 is secured to the side of the frame member 24 by a conventional fastener 30, such as a bolt and nut. A leg 32 of the bracket 22 extends under the frame member 24. The leg 32 has an elongate slot 34, the slot being aligned with a bore (out of view) on the underside of the frame member 24. Another fastener 36 (bolt and nut) secures the leg 32 to the underside of the frame member 24. A flange 38 of the bracket 22 has a bore 40 for receiving a jack bolt 42. The jack bolt 42 is threadably installed in the nut 44 with the bolt 42 extending through the bore 40 of the flange 38. A nut 46 is installed on the end of the bolt 42 extending through the flange 38 and the nut 46 in combination with the nut 44 is used to lock the bolt 42 in an adjusted position. The brackets 22 have bores 50, 52 for receiving a U bolt 54. The U bolt 54 (which is securable to the bracket 22 by nuts 56) encircles and clamps a receiver frame 60 to the bracket 22. The receiver frame 60, which is preferably of high strength square tubing has quick release mounts in the form of female receptacles 62, such as hollow cylindrical sockets, fitted in cross bores near each end. The receiver frame 60 is provided in a length to suit the running board 12. The sockets 62 are fixedly attached to the frame 60 as by welding. The sockets 62 have a cross bore 64 for receiving a quick release retaining pin 66. The pins 66, when installed in the bores 64 are retained by spring clips 68.

The running board 12 includes a board 70 preferably of a rigid structural configuration that resists any bending. In this embodiment the board is a one piece aluminum extrusion. Refer now to the sectional view of FIG. 6. The board 70 is somewhat oval in shape having a generally flat bottom 72 that blends with the curved sides 74 and 76. The board 70 has internal ribs 78, 80 that reach from the bottom 72 to the top 82 and are positioned as shown. The ribs 78, 80 extend the full length of the board 70. The top 82 has a large groove 84, circular in section, adjacent the side 74 and another large groove 86, circular in section, adjacent the side 76 and two small grooves 88 and 90, also circular in section, positioned between the grooves 84, 86 as shown. The large grooves 84 and 86 and the small grooves 88 and 90 extend the full length of the board 70.

Mountable to the top 82 of the board 70 is a runner 92 preferably molded of a rubber like material. As shown in FIG. 6, the under side of the runner 92 has large projecting lobes 94, 96 that are circular in section and extend the full length of the runner 92. The lobes 94, 96 will mate with the large grooves 84, 86 of the board 70. Smaller full length projecting lobes 98, 100 that are circular in section are provided to mate with the lobes 88, 90 of the board 70. The lobes of the runner 92 fitting in the grooves of the board 70 retains the runner 92 on the board 70. Upstanding treads 102 which extend the full length of the runner 92 are formed on the top of the runner 92.

Referring once again to FIG. 3, the running board 12 has support bushings 106 mountable into each end of the board 70. Each bushing 106 has a shaped elongate slot 108 for receiving an end 120 of a supporting member 118, such as a shaped tube, the height of the slot corresponding closely to the diameter of the tube 118 and the width of the slot 108 being greater than the diameter of the tube 118. The tube 118 is installable in the bushing 106 with a bore 122 of the tube aligned with a bore 112 of the bushing 106 A roll pin 110 is installable in the aligned bores to secure the tube 118 in the bushing 106. The slot 108, being wider than the diameter of the tube 118 permits the tube 118 to pivot in the bushing 106 about the axis of the pin 110. The bushings 106 are pressed into the ends of the board 70 and fit tightly in the space defined (shown in FIG. 6) by the inner surface 73 of the bottom 72, the sides 79, 81 of the ribs 78, 80 and the bottoms 89, 91 of the top 82 groove projections. A shoulder 114 on the bushing 106 limits the depth to which the bushing may enter the end of the board 70. It will be appreciated by those skilled in the art that the tube 118 installable at the opposite end of the board 70 is a "mirror" of the tube 118 illustrated in FIG. 3.

Each shaped tube 118 has a ring 124 mounted strategically for mounting a molded ca 134. The molded cap covers the end of the board 70 and a portion of the shaped tube 118 essentially as shown in FIG. 2. Bores 126 and 128 are, provided in the ring 124 to facilitate mounting the cap 134 by conventional fasteners 138, such as self tapping screws.

A bore 132 is provided in the tube 118 at a distance from the end 136 and is alignable with the bore 64 in the socket 62 when the projecting end 136 of the tube 118 is inserted into the socket 62 of the receiver frame 60.

Figure 5:
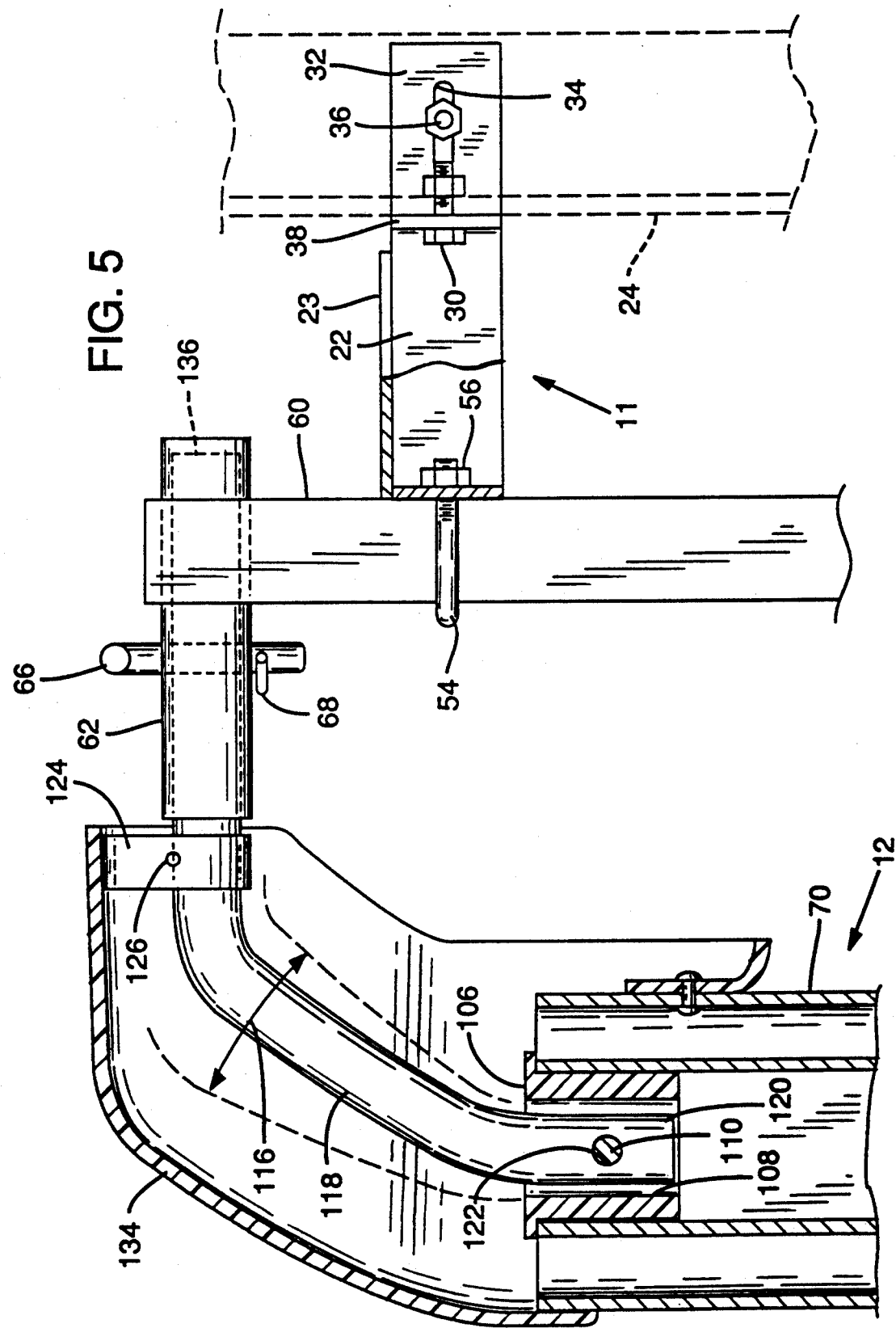
FIG. 5 is a view as viewed on view lines 5—5 of FIG. 2.

The running board 12 is assembled by inserting end 120 of each tube 118 into a bushing 106 and securing the tube 118 in the bushing by installing the roll pin 110 in the aligned bores 112 and 122. Each bushing 106 is pressed into an end of the board 70. Although the bushings 106 are pressed into the ends of the board 70, the bushings may be adjustably positioned to compensate for any length variance of the board 70. Recall that each tube is pivotally mounted in the bushing 106 permitting the tube to pivot on the axis of the pin 110. The pivotal movement, which is shown in dashed lines in FIG. 5 and indicated by the bi-directional arrow 116, aids in aligning the ends 136 of each tube 118 with a corresponding socket 62 of the frame 60 when installing the running board 12 to the sub frame support system 11.

Figure 4:
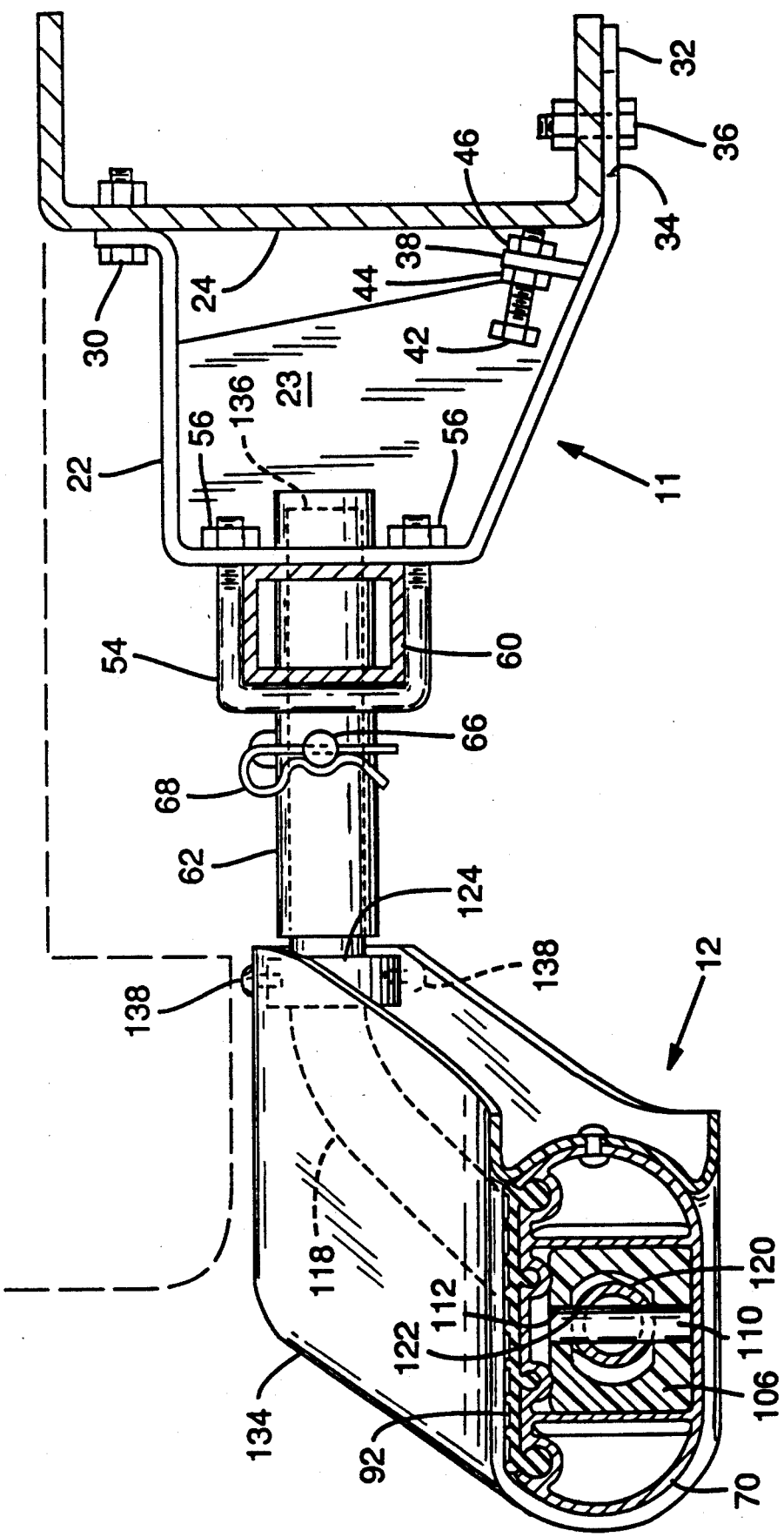
FIG. 4 is a view as viewed on view lines 4—4 of FIG. 2.

The sub frame support system is installed to the frame of the vehicle 10 as illustrated in FIG. 2. As previously indicated, another bracket 22 is provided to support the opposite end of the frame 60. In accordance with the previous description, a pair of brackets 22 are secured to the side of the frame 24 by a bolt and nut 30, one end of which is shown in FIGS. 2 and 4. The leg 32 of the bracket 22 is initially loosely secured to the bottom of the frame 24 by the bolt and nut 36. The frame 60 is installed in the U bolts 54 fitted to the brackets 22 and is loosely secured by the nuts 56. The frame 60 may be moved in the U bolts 54 to place the frame in the desired length way position.

The running board 12 is fitted to the sub frame support system 11 by inserting the ends 136 of the tubes 118 into the sockets 62 of the frame 60. The pivotal mounting of the tubes 118 in the bushings 106 aid in aligning the ends 136 with the sockets 62. Retaining pins 66 are inserted through the aligned bores 64 and 124 of the socket 62 and tube 118 The pins 66 are retained in position by spring clips 68. The running board 12 is now secured to the sub frame support system 11. The frame 60 is repositioned, if required, to adjust the position of the running board 12, by sliding the frame in the U bolts in either desired direction as indicated by the directional arrow 58. The nuts 56 are tightened when the frame 60 is in the desired position to fixedly clamp the frame to the brackets 22.

The final adjustment to the sub frame support system is now made and is best understood by referring to FIG. 4. Recall that the bracket 22 is loosely secured to the bottom of the frame 24 by the fastener 36. As seen in the figure, the jack bolt 42 is in abutment with the side of the frame 24. (FIG. 3 shows nuts 44 and 46 loose, however either of the nuts may be fixedly attached to the flange 38 as by welding to make adjustments to the jack bolt easier). The jack bolt 42 is utilized to adjust the height of the running board 12 mounted to the sub frame support system 11. Forcing the jack bolt 42 against the frame 42 will elevate the running board and releasing the jack bolt will lower the running board. The bracket 22 will flex adequately in the zone where the fastener 30 secures the bracket 22 to the side of the frame 24 to permit either the elevation or lowering of the running board 12. The slot 34 in the leg 32 of the bracket 22 permits the leg 32 to move relative to the frame 24 with the fastener 36 loosely inserted.

When the running board is in the desired position, the jack bolt 42 is locked in position by tightening the lock nuts 44 and 46. The fastener 36 is then securely tightened to fixedly secure the leg 32 of the bracket 22 to the under side of the frame 24. The running board is now secured to the vehicle 10 as illustrated in FIG. 1. The shape of the tube 118 extending from the end of the board 70 provides an inclined angle at each end of the running board 12. The cap 134 is shaped to conform to the inclined angle and as seen in FIG. 1, the running board 12 is inclined at each of its ends. The inclined ends aid in ramping the board over or deflecting material and objects encountered by the running board 12.

The running board 12 may be removed from the vehicle by simply removing the retaining pins 66 and pulling the tubes 118 out of the sockets 62. The sub frame support system 11 remains attached to the vehicle. As seen in FIG. 4, the sub frame support system is above the lower edge of the frame 24 and does not interfere with the clearance of the vehicle. The sub frame support system 11 thus provides the structure for the removable mounting of an accessory, such as a running board 12. The accessory may be mounted and removed quickly without detaching supporting structure from the vehicle.

The preferred embodiment illustrated and described details specific structural forms. It is apparent that other structure may be utilized to fabricate the components. The sockets 62 for example, may be of square tubing and the tube 118 of the running board may also be constructed of square tubing that is insertable into the socket to facilitate the quick release mounting and dismounting of the running board to the sub frame support system.

PRIOR ART

With a single exception, known running boards are the type that are permanently attached to the vehicle body. The form of attachment is inferior in several respects. The body of a vehicle does not provide the rigidity that is provided by the vehicle frame. Furthermore, such a mounting system typically utilizes an upturned flange running the length of the running board that fits against the vehicle body for the provision of fasteners. Such an upturned flange detrimentally changes the appearance of the vehicle. The present invention allows space between the running board and vehicle body to be open and provides for a more desirable appearance.

A prior removable running board utilizes fore and aft lifting jack mounts provided on the vehicle frame. The mounts are jack receiving openings in the frame located strategically for jacking the vehicle off of a selected wheel. Such a running board is applicable for attachment to that vehicle only and does not provide the versatility of the present invention as obvious from the above.

It will be apparent to those skilled in the art that variations and modifications may be made without departing from the true spirit and scope of the invention. The invention is therefore not to be limited to the embodiments described and illustrated but is to be determined by the appended claims.

What is claimed is:

1. A running board assembly for a vehicle, comprising:
   brackets universally mountable to a vehicle frame of said vehicle;
   an elongate receiving frame, said brackets attachable to said elongate receiving frame at selected positions along the length thereof to secure said receiving frame to said vehicle frame at a selected position relative to said vehicle frame;
   a pair of releasable mounts provided on said receiving frame at fixed spaced positions along its length;
   a running board;
   a pair of support members positioned adjacent each end of said running board and releasably mountable to said releasable mounts of said receiving frame; and
   quick release fasteners fastening the supporting members of the running board to the releasable mounts of the receiving frame.

2. A running board assembly as defined in claim 1, wherein;
   the receiving frame mounts are fixed receptacles and the support members have projecting ends configured to project into said receptacles, said support members pivotally attached to said running board for pivoting about a vertical axis to thereby permit alignment of the support members with the fixed receptacle mounts.

3. A running board assembly as defined in claim 2, including;
   bushings inserted into the ends of the running board, said bushings having openings oversized for the support members and a vertically extended pin for pivotally mounting the support members to the bushing and thereby the running board end for providing the pivotal alignment of the support members to the releasable mounts.

4. A running board assembly as defined in claim 3, wherein;
   said bushings are adjustably inserted in the ends of the running board for adjusting the spacing between the support members for mating the support members to the releasable mounts.

5. A running board assembly as defined in claim 4, wherein;
   said support members provide an inclined angle at each end of the running board for deflecting objects encountered by the running board.

6. A sub frame support system for releasably mounting an accessory to a vehicle, comprising:
   an elongate receiving frame;
   brackets mountable to a vehicle frame and to the receiving frame at selected positions along its length for fixedly mounting the elongate receiving frame at a selected position relative to the vehicle frame;
   a pair of cylindrical mounts fixed in spaced relation to the receiving frame;
   a pair of elongate mounts configured to fit the cylindrical mounts;
   a running board and said elongate mounts pivotally mounted about a vertical pivot to said running board and spaced to fit the cylindrical mounts whereby pivoting of the elongate mounts facilitates alignment for removable mounting of the elongate member to the receiving frame; and a releasable lock for releasably locking the cylindrical mounts to the elongate mounts for securing the running board to the receiving frame.

7. A running board assembly for a vehicle comprising;
- a pair of cylindrical mounts mountable at fixed space positions to a vehicle frame of said vehicle;
- an elongate running board having a receiving bore at each end;
- a configured support member for each end, said support member having one end inserted into the receiving bore of the running board and having a second end inserted into one of the cylindrical mounts, said receiving bore being oversized relative to said inserted end and a fastening pin vertically extended down through the running board and support member end to pivotally connect the support member end to said running board end and thereby provide limited pivoting of said support member relative to said running board as permitted by the oversized receiving bore;
- a releasable fastener fastening said second end of said support member to said cylindrical mount to provide for selective removal and remounting of said running board to the vehicle.

* * * * *